United States Patent
Machac, Jr. et al.

(10) Patent No.: US 6,187,108 B1
(45) Date of Patent: Feb. 13, 2001

(54) ALKYLENE CARBONATE-BASED CLEANERS

(75) Inventors: James R. Machac, Jr.; Edward T. Marquis, both of Austin, TX (US)

(73) Assignee: Huntsman Petrochemical Corporation, Austin, TX (US)

(*) Notice: Under 35 U.S.C. 154(b), the term of this patent shall be extended for 0 days.

(21) Appl. No.: 09/434,872

(22) Filed: Nov. 4, 1999

Related U.S. Application Data

(60) Provisional application No. 60/121,816, filed on Feb. 25, 1999.

(51) Int. Cl.[7] .............................. C23D 17/00; C09D 9/00
(52) U.S. Cl. .............................. 134/38; 134/34; 510/201; 510/202; 510/203; 510/206
(58) Field of Search .................................. 134/1, 38, 39, 134/40, 41, 34, 42; 510/188, 202, 174, 201, 118, 175, 203, 206

(56) References Cited

U.S. PATENT DOCUMENTS

| | | |
|---|---|---|
| 5,007,969 | 4/1991 | Doscher . |
| 5,098,594 * | 3/1992 | Doscher . |
| 5,124,062 * | 6/1992 | Stevens . |
| 5,178,788 | 1/1993 | Marquis et al. . |
| 5,183,514 | 2/1993 | Marquis et al. . |
| 5,204,026 | 4/1993 | Doscher-Good . |
| 5,236,614 | 8/1993 | Jacquet et al. . |
| 5,298,081 | 3/1994 | Marquis . |
| 5,449,474 | 9/1995 | Lucas et al. . |
| 5,629,277 * | 5/1997 | Plishka . |
| 5,665,690 | 9/1997 | Lucas et al. . |
| 5,691,289 * | 11/1997 | Purcell et al. . |
| 6,040,284 * | 3/2000 | Marquis et al. . |
| 6,071,867 * | 6/2000 | Purcell et al. . |

* cited by examiner

Primary Examiner—Yogendra Gupta
Assistant Examiner—Gregory E. Webb
(74) Attorney, Agent, or Firm—O'Keefe, Egan & Peterman LLP

(57) ABSTRACT

Process useful to clean and remove uncured resins. The resins to be treaded include epoxy, polyester (fiberglass) and polyurethane foam. The compositions include alkylene carbonate, including propylene and ethylene carbonate.

28 Claims, No Drawings

ALKYLENE CARBONATE-BASED CLEANERS

This application claims priority to provisional application Ser. No. 60/121,816, filed Feb. 25, 1999, incorporated herein by reference.

BACKGROUND OF THE INVENTION

This invention concerns compositions useful in cleaning up and removing residues from polymer manufacture, particularly the removal of uncured polyester, uncured epoxy resin and uncured polyurethane foam.

Various solvents have been used for decades in cleaning residues generated as a result of use of pains coatings, varnishes, sealants and so forth as well as residues generated during the manufacture of various polymers. It is known that certain solvents and solvent combinations which were once accepted as useful have come under scrutiny and increasing regulation by agencies at various levels of government for the health and environmental risks they pose. Accordingly, workers have continually desired to discover new solvents and solvent combinations capable of exerting adequate solvency characteristics on a variety of residues for the removal of such residues with at least the same degree of convenience as exhibited by the previously employed solvents.

The production of many products produced from polymeric materials and articles of manufacture derived therefrom generally involves the admixture of two or more materials. In the case of polyurethanes, by example, two subcombinations of materials are mixed together: a polyol and an isocyanate portion. The polyol typically contains ingredients such as plasticizers, catalysts, adhesion promoters, pigments, etc., and the isocyanate portion is typically neat isocyanate. Upon admixture of these subcombinations, polyurethane polymers are readily and rapidly formed, the reaction being nearly instantaneous. Owing to their versatility, polyurethane polymers may be caused to exist in several forms depending on the intended end use, including without limitation elastomeric strands, such as gasket materials, or various foams. Often, the polyol portion and isocyanate portion are pumped into a mixing fixture, such as a mixing head, in which they are subsequently combined or simultaneously projected onto a surface or into a mold. As in nearly all cases of reactive chemistry, there exists an optimum stoichiometric ratio of reactants which, if achieved, ensures that there is no excess of either starting material in the finished product. In the case of polyurethane, the reaction stoichiometry is one hydroxy group on the polyol molecule for each isocyanate group on the isocyanate molecule.

During the formation of polyurethane, as is also the case when materials in general which are capable of forming residues are mixed together, there exists a large window of opportunity for the sub-combination (e.g., the isocyanate and polyol portions) to be combined with one another in non-stoichiometric ratios, in addition to stoichiometric ratios. Organic residues produced by the stoichiometric and non-stoichiometric admixture of reactant subcombinations often render by-products which may be gummy and often gel-like, having cumbersome tenacity toward nearly all surfaces with which they come into contact.

Accordingly, manufacturers of various products have found it desirable from both the cleanliness and economic aspects to expend effort towards the development of methods for elimination or reduction of the formation of compounds (stoichiometric or non-stoichiometric) in locations other than the intended surface or mold. While such efforts have been successful in many cases to a high degree, there still exist circumstances in which it is necessary to have at hand a solvent or other chemical solution which can be applied to a cured or semi-cured urethane, epoxy or polyester or residue to assist in the clean-up and cause the polymer or residue to be readily wiped away with a cloth or brush. While several cleaning solutions for this application exist, they are often possessive of drawbacks which make their use undesirable. The undesirability usually stems from either a prohibitively high cost, health risk or environmental risk.

Similarly, industry is desirous of new, environmentally friendly compositions to remove uncured epoxy resin and uncured polyester (e.g., fiberglass) materials. These uncured resins often remain on application tools after use, for example.

If a family of compositions were available which was easy to prepare, were effective to remove uncured resin materials and which contained readily available ingredients of relatively low-cost that were not onerous to the environment or detrimental to the health of workers using the same, then such compositions would undoubtedly be welcomed by many users in the industry. The present invention provides such compositions.

SUMMARY OF THE INVENTION

This invention provides a solution to one or more of the disadvantages or needs discussed above. More particularly, this invention provides solutions effective for cleaning (removing) residues of various organic materials, including paints, coatings, varnishes and the like, and particularly residues of uncured polyurethane foam, polyester and epoxy resins, as well as other polymeric materials produced from a combination in which there may or may not be a preferred stoichiometry of mixing.

In general, the solutions of this invention comprise at least one alkylene carbonate such as ethylene carbonate, propylene carbonate and butylene carbonate. Other solvents may also be present in the composition, such as glycol ether, ketone, alcohol, dibasic ester ("DBE") and a heterocyclic compound. The formulations made in accordance with the invention have heretofore unseen properties with respect to their ability to soften the various residues, including those adhered to surfaces to the point where their removal from the surfaces is a simple operation. The compositions of this invention are advantageously of low cost. Likewise, the compositions of this invention that contain volatile materials such as acetone employ such materials in relatively small amounts so that the flash point of the composition remains relatively high. Furthermore, compositions that contain NMP, or related nitrogen-containing compound, employs the NMP in relatively small amounts. This is advantageous because the toxicity of the resulting composition may be far less than using pure or concentrated NMP solutions.

In one broad respect, this invention is a process for removing uncured epoxy resin from a surface, comprising: applying a composition comprising at least one alkylene carbonate to the uncured epoxy resin in an amount effective to dissolve at least a portion of the uncured epoxy resin. The composition for cleaning epoxy resin contains an alkylene carbonate and may also contain additional components. As used herein, "uncured" means a resin (whether polyester, polyurethane, epoxy or other resin) that has not fully reacted to form a hard material. Rather, uncured means a resin that is sticky, tacky, soft and/or gummy, and which leaves an imprint when pressed with a finger tip or other object. In the case of foams, uncured refers to materials that easily collapse in contrast to materials that have formed a rigid skin.

The surface may include any solid structure on which the uncured material rests. Representative examples of such surfaces include, but is not limited to, application tools and floors (e.g., cement flooring).

In another broad respect, this invention is a process for removing uncured polyester from a surface, comprising: applying a composition comprising at least one alkylene carbonate to the uncured polyester in an amount effective to dissolve at least a portion of the uncured polyester. The composition for cleaning uncured polyester contains an alkylene carbonate and may also contain additional components.

In another broad respect, this invention is a process for removing uncured polyurethane foam from a surface, comprising: applying a composition comprising at least one alkylene carbonate to the uncured polyurethane foam in an amount effective to dissolve at least a portion of the uncured polyurethane foam. The composition for cleaning uncured polyurethane foam contains an alkylene carbonate and may also contain additional components.

DETAILED DESCRIPTION OF THE INVENTION

The present invention is particularly concerned with compositions of matter useful in the clean up of uncured polyurethane foams, uncured polyester and uncured epoxy resin, in which there may or may not be a preferred stoichiometry of mixing. As used in this specification and the appended claims the term "residue" means any paint, coating, varnish, sealant, which contains a polymeric component, including those containing polyurethane, epoxy and polyester as well as any component of a formulation of any of the foregoing.

The cleaning compositions useful in the practice of this invention include at least one alkylene carbonate. Combinations of two or more alkylene carbonates may also be employed.

The alkylene carbonate used in the present invention may contain from 2 to 10 carbon atoms. Representative examples of alkylene carbonates that may be employed in the practice of this invention include ethylene carbonate, propylene carbonate and butylene carbonate. In the practice of this invention, propylene carbonate is preferred. The alkylene carbonate may be present in the cleaning composition in an amount up to and including 100 percent by weight. In one embodiment, the amount of alkylene carbonate may vary from about 10 to about 80 percent by weight. In another embodiment, the amount of alkylene carbonate may vary from about 15 to about 75 percent.

The compositions of this invention may optionally include an alcohol. In general, the alcohol may contain up to about 20 carbons. Representative, non-limiting examples of such alcohols include methanol, ethanol, propanol, butanol and benzyl alcohol. In the practice of this invention, benzyl alcohol is preferred. Generally, compositions of this invention contain from 0 to about 90 percent by weight alcohol. In one embodiment, the amount of alcohol may vary from about 5 to about 60 percent by weight, preferably from about 10 to about 50 percent.

The compositions of this invention may optionally include a glycol ether. In general, the glycol ether may contain up to about 20 carbons. Representative, non-limiting examples of such glycol ethers include propylene glycol methyl ether (PM), dipropylene glycol methyl ether (DPM), or dipropylene glycol n-butyl ether (DPNB). Generally, compositions of this invention contain from 0 to about 90 percent by weight glycol ether. In one embodiment, the amount of glycol ether may vary from about 5 to about 60 percent by weight, preferably from about 10 to about 50 percent.

In general, the DBE used in this invention include aliphatic diesters having a molecular weight of up to about 200. A DBE mixture is currently available commercially from DuPont. DBE has the advantage of being considered to be safe and of low toxicity. More than one dibasic ester can be used in the present compositions. DBE is a well known material and is currently available commercially. In general, the DBE used in this invention may be described as being a $C_1$ to $C_6$ dialkyl ester of a $C_2$ to $C_{10}$ aliphatic di-acid, and particularly a $C_1$ to $C_4$ dialkyl ester of a $C_2$ to $C_6$ aliphatic di-acid. For example, the DBE used in the practice of this invention may be derived from various di-acids such as from adipic acid, glutaric acid and succinic acid.

The amount of DBE used in the practice of this invention may vary widely. In general, the amount of DBE may be from about 5 percent by weight to about 60 percent by weight. In one embodiment, the amount may be in the range from about 10 to about 50 percent by weight.

The compositions of this invention may optionally include a ketone. In general, the ketone may contain up to about 20 carbons. Representative, non-limiting examples of common ketone solvents include acetone, methyl ethyl ketone (MEK), 5-methyl-2-hexanone (MIAK), and methyl isobutyl ketone. Generally, compositions of this invention contain from 0 to about 90 percent by weight of a ketone. In one embodiment, the amount of ketone may vary from about 1 to about 25 percent by weight. In one embodiment, the amount may range from about 1 to about 15 percent by weight.

The heterocyclic compounds used in the practice of this invention may include carbon atoms and at least one nitrogen compound. The heterocyclic compounds may include a five-membered or six-membered ring structure. Representative, non-limiting examples of such heterocyclic compounds include nitrogen-containing compounds such as pyrrolidone and derivatives thereof such as N-methyl pyrrolidone (NMP). In general, the heterocyclic compound contains from 4 to 20 carbon atoms. Generally, the cleaning compositions of this invention may contain 0 to about 90 percent by weight of the heterocyclic compound. In one embodiment, the cleaning composition contains from about 10 to about 60 percent by weight of the heterocyclic compound. In another embodiment, the composition contains from about 15 to about 50 percent of the heterocyclic compound.

The compositions of this invention may also optionally contain a wide variety of other organic cosolvents. Likewise, the present invention may be practiced in the absence of one or more of such solvents. Non-limiting examples of representative classes of such other cosolvents include hydrocarbons, glycols, glycol ether esters, ethers, esters, phenols, glycols, sulfur-based solvents, chlorinated hydrocarbons, aromatic hydrocarbons nitrated hydrocarbons, amides and ketones. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common mono-ester solvents and lactones include material such as butyrolactone, ethyl acetate and butyl acetate. Representative examples of common phenols include phenol and the cresols and resorcinols. Representative examples of common glycol solvents include ethylene, propylene and butylene glycols as well as methyl propane diol. Representative examples of common sulfur-based solvents include dimethylsulfoxide (DMSO) and sulfolane. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide.

In addition to the components described above, it is contemplated that the compositions of this invention may optionally contain activators such as formic or oxalic acid, thickeners, surfactants, acids or bases, stabilizers, corrosion inhibitors, and other additives commonly used in paint removers.

Non-limiting examples of representative thickeners include cellulose ethers such hydroxypropyl cellulose, ethyl cellulose, ethyl hydroxyethyl cellulose, methyl cellulose, and other alkyl or hydroxy alkyl cellulose; silica including colloidal silica; clays such as bentonite and montmorillonit; alumina including colloidal alumina; gum arabic; tragacanth; agar; sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the trade name Methocel® F4MPRG and Dow's Experimental Polymer SCS 41067.06. Another preferred thickener in the practice of this invention is polyvinyl pyrrolidone (PVP). When a thickener is used, the amount of such thickener can vary depending on the desired level of thickening for the given application. In general, the amount of thickener employed is about 1 to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Non-limiting examples of representative surfactants which may optionally be used in the practice of this invention include non-ionic, anionic, cationic and amphoteric surfactants, such as monocarboxyl cocoimidazoline, higher alkyl sulfate sodium salts, tridecyloxy poly(alkyleneoxy ethanol), ethoxylated or propoxylated alkyl phenol, alkyl sulfonamides, C10–18 alkaryl sulfonates such as alkylbenzene sulfonates, cocoimidazoline cocoaminopropionate, cetylpalmitic alkanol amides, hydrogenated castor oil, isooctylphenyl polyethoxy ethanol, sorbitan monopalmitate, C8–18 alkyl pyrrolidone, cocoaminopropionic acid and polyethoxy amino salts thereof. When used, the amount of surfactant should be sufficient to render the composition miscible. Typically the amount of surfactant is from about 0.1 to about 10 percent by weight of the total composition.

The conditions under which the process of this invention may be practiced may vary. Typically, the process will be conducted under ambient atmospheric conditions. Temperatures from 0° F. to about 125° F. (0° C. to about 52° C.), although higher temperatures may be used. The cleaning composition may be applied by any convenient method such as by dipping, spraying or brushing the composition onto the material to be removed. The composition may be contacted with the residue with or without agitation. Usually, agitation accelerates dissolving of the residue. For resistant residue, it may be desirable to apply the cleaning composition two or more times to fully dissolve the residue away from the substrate. It may be desirable to use a rag, scraper or the like to fully remove residue from the surface after the cleaning composition has been given time to fully act. Alternatively, high pressure water spray may be employed to remove residue after the cleaning composition has had time to act. It may be appreciated that the time required for the cleaning composition to act will vary due to a variety of factors such as temperature, residue type and particular cleaning formulation being used. In general, application times are between one minute and one hour, although longer application times may be used.

It is known in the art that certain heterocyclic compounds are useful alone in the cleanup of polyurethane residues, particularly pyrrolidone derivatives and especially N-methyl pyrrolidone ("NMP"). These make useful cleaning aids for polyurethane residues. This material is often preferred because of its effectiveness, high flash point and low vapor pressure which reduce inhalation hazards to workers. However, NMP is an expensive material costing in exceed of $2.00 per pound, which is cost prohibitive for many operations to employ. Clearly, a formulation possessing the effectiveness of pure NMP but of lower cost is highly desirable. This invention provides such compositions.

According to this invention, certain combinations of liquid solvents containing majority amounts of materials other than NMP have been unexpectedly discovered to possess equal or superior effectiveness at assisting in the clean up of various organic residues as compared with pure NMP. The unexpectedness stems from the apparent inability of any of the components of the mixture other than the NMP, to clean the residues to the same high degree of effectiveness as the mixture, coupled with the fact that mere dilution of NMP with a solvent does not necessarily produce a composition as effective as those taught herein.

Rigid polyurethane foam formulations are well known in the art and are commercially available. Rigid foams are more highly cross-linked than either elastomers or flexible foams. Other characteristics generally true of rigid polyurethane foams include (1) a structure having a high percentage of closed cells; (2) low thermal conductivity; (3) nonreversible deformability; (4) good load-bearing ability; and (5) high dimensional stability. Generally, rigid polyurethane foams are based on polyols having a molecular weight less than 1000, and more often from about 400 to about 800. Rigid polyurethane foams are usually based on a polyol having a functionality of 2 to 8, and more typically from about 4 to about 8.

Flexible polyurethane foam formulations also are well known in the art and are commercially available. In contrast to rigid foams, flexible foams are not highly cross-linked. Other characteristics generally true of flexible polyurethane foams include (1) a structure having a high percentage of open cells; (2) air permeability; (3) reversible deformability; (4) a limited resistance to an applied load; and (5) low dimensional stability. Generally, flexible polyurethane foams are based on polyols having a molecular weight greater than about 1000 (about 70 atoms or more per chain).

Flexible polyurethane foams usually are based on a polyol having a functionality of about 2 to 4, and more typically of about 2 to 3.

Epoxy resins are well known materials. In general, epoxy resins are thermosetting resins based on the reactivity of an epoxide group. Epoxy resins are commonly made from epichlorohydrin and bisphenol A; however, aliphatic polyols such as glycerol may also be used instead of the bisphenol A. Molecules of this type have glycidyl ether structures in the terminal positions, have many hydroxyl groups and cure readily with amines. Another type is made from epichlorohydrin and novolak resin (phenol-formaldehyde). Another type is made from polyolefins oxidized with peracetic acid. These have more epoxide groups within the molecule as well as in the terminal positions, but require high temperatures to cure. Many modifications of both types are made commercially. Reactive epoxy forms a tight cross-linked polymer network. Most epoxy resins are of the two-part type which harden when blended.

Polyester resins are well known materials. In general, polyester resins are any of a group of synthetic resins that are polycondensation products of dicarboxylic acids with dihydroxy alcohols. Maleic anhydride is frequently used instead of a dicarboxylic acid. Many polyesters contain ethylenic acid. Many polyesters contain ethylenic unsaturation, which is often introduced through use of unsaturated acids. The unsaturation is often cross-linked with a compatible monomer such as styrene, and thus becoming thermosetting. The principal unsaturated acids are maleic, fumaric or maleic anhydride. The dihydroxy alcohols most generally used are ethylene, propylene, diethylene and dipropylene glycols. Polyester resins typically, when catalyzed, cure at room temperature under little or no pressure.

The following examples are representative of this invention and are not intended to limit the scope of this invention or claims herein. Unless otherwise denoted, all percentages are by weight. As shown in the tables that follow, several formulations according to the invention have been prepared and rated for their effectiveness with respect to cleaning polyurethane, epoxy and polyester residues. In the tables, several abbreviations are used, the meanings of which are:

EC=ethylene carbonate
PC=propylene carbonate
BC=butylene carbonate
EC-25=25/75 mixture (weight percent) of EC and PC
EC-50=50/50 mixture (weight percent) of EC and PC
NMP=N-methyl pyrrolidone
DPM=di-propylene glycol, monomethyl ether
BA=benzyl alcohol
PM=propylene glycol, monomethyl ether
DBE=dibasic esters sold by EI DuPont de Nemours under the trade name "DuPont® DBE"
MIAK=5-methyl-2-hexanone
DBP=dipropylene glycol butyl ether
DB=diethylene glycol butyl ether
EB=ethylene glycol n-butyl ether To prepare the compositions of this invention, the various components are combined and mixed using the prescribed amounts of each component at room temperature using sufficient mechanical agitation to render the resulting mixtures homogeneous. Unless otherwise denoted throughout this specification and appended claims, all amounts and percentages are in weight percent with respect to the total weight of the final mixture. In each of the tables, there is shown a rank of how well the solution is observed to remove various residues in general.

EXAMPLE 1

Removal of Uncured Polyurethane Residue

The compositions shown in table 1 were employed to dissolve uncured polyurethane foam. In this example, the following procedure was employed. Polyurethane foam was applied to aluminum strips and allowed to cure for three hours. The cleaning composition was prepared and poured into a clean beaker. The aluminum strips were then submersed in the cleaning composition. The uncured foam was allowed to soak, then evaluated for cleaning ability (removability of the foam).

A rating system as follows was used to quantify the results: 1=excellent; 2=good; 3=fair; 4=poor

TABLE 1

CLEANING POLYURETHANE FOAM

| No. | PC | EC | NMP | DPM | BA | MIAK | PM | DBE | Rating |
|---|---|---|---|---|---|---|---|---|---|
| 1 | | | 100 | | | | | | 1 |
| 2 | | | | | | | 100 | | 1 |
| 3 | 50 | | 50 | | | | | | 2 |
| 4 | 50 | | | 50 | | | | | 3 |
| 5 | 50 | | | | | | 50 | | 2 |
| 6 | 50 | | | | | | | 50 | 4 |
| 7 | 40 | | | 20 | | | | 40 | 4 |
| 8 | 40 | | | | 20 | | | 40 | 4 |
| 9 | 40 | | | | 60 | | | | 4 |
| 10 | 33.3 | | 33.3 | | | | | 33.3 | 4 |
| 11 | 26 | | 20 | 10 | 10 | 12 | 12 | 12 | 4 |
| 12 | 25 | | 25 | | 25 | | | 25 | 2 |
| 13 | 25 | | 25 | | 20 | 10 | | 20 | 4 |
| 14 | 25 | | 25 | 10 | 10 | 10 | 10 | 10 | 4 |
| 15 | 25 | | | 25 | 25 | | | 25 | 4 |
| 16 | 25 | | 15 | | 15 | 15 | 15 | 15 | 1 |
| 17 | 25 | | 15 | 15 | 15 | 15 | | 15 | 4 |
| 18 | 25 | | 50 | | | | | 25 | 4 |
| 19 | 25 | 25 | 50 | | | | | | 2 |
| 20 | 25 | 25 | | | | | 50 | | 1 |
| 21 | | 75 | | | | | 25 | | 4 |
| 22 | 23 | | 23 | 10 | 10 | 12 | 12 | 10 | 4 |
| 23 | 22 | | | | 60 | | | 18 | 4 |
| 24 | 20 | | 20 | 10 | 20 | 10 | | 20 | 4 |
| 25 | 20 | | 20 | 10 | 20 | | 10 | 20 | 4 |
| 26 | 20 | | 20 | 10 | 10 | 15 | 15 | 10 | 1 |
| 27 | 15 | | 15 | 15 | 15 | 15 | | 25 | 4 |
| 28 | 15 | | 15 | 15 | | 15 | | 40 | 1 |

As is evident from the data in Table 1 an alkylene carbonate concentration of 33% to 50% may be used in the presence of other organic oxygen compounds to produce solutions which are very effective at softening cured polyurethane residues. Samples 1 and 2 are comparative experiments, not examples of the invention, where full strength NMP and PM are employed.

EXAMPLE 2

Removal of Uncured Polyester

This example demonstrates the ability of the cleaning solution to dissolve uncured polyester. A polyester resin was prepared by mixing 65 percent by weight of a filler (MP200 calcium carbonate, Omya, Inc.) and 35 percent by weight of an epoxy resin (McWhorter Technology 718-1592 polyester resin). The resulting mixture was coated onto aluminum strips to provide a coating about 30 mils thick. The resin was allowed to cure at least 12 hours, then submerged in a beaker of cleaning composition with no agitation. The resin was not fully cured and instead tacky.

The following Tables show the resulting data. In particular, Tables 2–4 show data for a variety of cleaning compositions on polyester resin. In Tables 2–4, data is provided that shows the percentage of uncured resin removed at given times.

TABLE 2

POLYESTER REMOVAL

| Cleaning Compositions | Ratios (by wt.) | Percentage of resin removed |
|---|---|---|
| PC/PM | 50/50 | 27 |
| BC/NMP/DBE | 33.3/33.3/33.3 | 26.5 |
| BC/NMP/DBE/BA | 25/25/25/25 | 27 |
| BC/PM | 50/50 | 26 |
| EC-50/NMP/DBE | 33.3/33.3/33.3 | 25.5 |
| EC-50/PM | 50/50 | 20 |
| EC-50/DBE | 50/50 | 27.5 |
| EC-50/DBE/DB | 40/40/20 | 20 |
| EC-50/DBE/DPM | 40/40/20 | 17 |
| EC-50/PM | 75/25 | 18 |
| PC/DBE | 75/25 | 27.5 |
| PC/DPM | 50/50 | 24.5 |
| EC-50/DPM | 75/25 | 24 |
| EC-50/EB | 50/50 | 22 |
| EC-50/EB | 75/25 | 27 |
| EC-25/EB | 75/25 | 27 |
| PC/ACETONE | 99/1 | 24.7 |
| PC/ACETONE | 98/2 | 25 |
| PC/ACETONE | 96/4 | 23.6 |
| PC/ACETONE | 95/5 | 22 |

TABLE 3

UNCURED POLYESTER REMOVAL

| Cleaning Compositions Components/Percentages | % of resin removed | | | |
|---|---|---|---|---|
| | 10 min | 20 min | 30 min | final |
| Dupont DBE† | 25% | 90% | 95% | 32 min 100% |
| Butylene Carbonate | 10% | 25% | 50% | 60 min 95% |
| Propylene Carbonate | 10% | 50% | 75% | 51.5 min 100% |
| EC-50 | 10% | 30% | 50% | 55.5 min 100% |
| PC/NMP/DBE 33.3%/33.3%/33.3% | 30% | 50% | 90% | 35 min 100% |
| PC/NMP/DBE/BA 25%/25%/25%/25% | 30% | 50% | 80% | 47 min 100% |
| PC/PM 50%/50% | 50% | 80% | 27 min 100% | — |
| PC/DBE 50%/50% | 30% | 50% | 80% | 45 min 100% |
| PC/DBE/DB 40%/40%/20% | 30% | 50% | 80% | 45.5 min 100% |
| PC/DBE/DPM 40%/40%/20% | 30% | 50% | 80% | 45 min 100% |
| BC/NMP/DBE 33.3%/33.3%/33.3% | 40% | 80% | 26.5 min 100% | — |
| BC/NMP/DBE/BA 25%/25%/25%/25% | 50% | 90% | 27 min 100% | — |
| BC/PM 50%/50% | 50% | 90% | 26 min 100% | — |
| BC/DBE 50%/50% | 50% | 75% | 80% | 37 min 100% |
| BC/DBE/DB 40%/40%/20% | 30% | 50% | 75% | 41 min 100% |
| BC/DBE/DPM 40%/40%/20% | 30% | 50% | 80% | 40 min 100% |
| EC-50/NMP/DBE 33.3%/33.3%/33.3% | 30% | 50% | 25.5 min 100% | — |
| EC-50/NMP/DBE/BA 25%/25%/25%/25% | 20% | 30% | 95% | 32 min 100% |
| EC-50/PM 50%/50% | 30% | 20 min 100% | — | — |
| EC-50/DBE 50%/50% | 25% | 75% | 27.5 min 100% | — |
| EC-50/DBE/DB 40%/40%/20% | 50% | 20 min 100% | — | — |
| EC-50/DBE/DPM 40%/40%/20% | 50% | 17 min 100% | — | — |
| DBE | 25% | 50% | 95% | 35 min 100% |
| BC/PM 25%/75% | 30% | 95% | 24 min 100% | — |
| PM/BC 25%/75% | 30% | 20 min 100% | — | — |
| BC/DPM 50%/50% | 30% | 70% | 95% | 31.5 min 100% |
| BC/DPB 50%/50% | 30% | 50% | 70% | 55 min |
| EC-50/PM 75%/25% | 50% | 18 min 100% | — | — |
| PM/EC-50 75%/25% | 30% | 90% | 27 min 100% | — |

†not an example of the invention

TABLE 4

SURVEY OF CLEANING COMPOSITIONS FOR POLYESTER

| Cleaning Compositions Components/Percentages | % of resin removed | | | |
|---|---|---|---|---|
| | 10 min | 20 min | 30 min | Final |
| EC-50/DPM 50%/50% | 40% | 80% | 95% | 35.5 min. 100% |
| PC/DPM 50%/50% | 5% | 90% | 24.5 min. 100% | — |

TABLE 4-continued

SURVEY OF CLEANING COMPOSITIONS FOR POLYESTER

| Cleaning Compositions | % of resin removed | | | |
|---|---|---|---|---|
| Components/Percentages | 10 min | 20 min | 30 min | Final |
| EC-50/DPM 75%/25% | 30% | 95% | 24 min. 100% | — |
| PC/DPM 75%/25% | 10% | 70% | 98% | 31 min. 100% |
| Dupont DBE† | 5% | 95% | 24.5 min. 100% | — |
| Acetone† | 3.5 min. 100% | — | — | — |
| EC-50/EB 50%/50% | 20% | 95% | 22 min. 100% | — |
| PC/EB-50%/50% | 30% | 50% | 95% | 31 min. 100% |
| EC-50/EB 75%/25% | 30% | 80% | 27 min. 100% | — |
| PC/EB 75%/25% | 30% | 60% | 90% | 32 min. 100% |
| Dupont DBE† | 30% | 80% | 28.5 min. 100% | — |
| Acetone† | 5 min. 100% | — | — | — |

†comparative experiment, not an example of the invention

EXAMPLE 3

Removal of Uncured Epoxy Resin

Example 3 demonstrates the use of the cleaning compositions of this invention to remove uncured epoxy resin from substrates. In this example, 25 grams of cleaning solution was added to 5 grams of epoxy resin, then allowed to sit without agitation. The results are shown in Tables 5 and 6. While EPON 828 epoxy resin was used for Table 5, DER 383 was used in Table 6.

TABLE 5

EPON 828 EPOXY RESIN REMOVAL

| Cleaning Composition | PC | EC-50 | NMP | DPM | BA | MAIK | PM | PMA | Acetone | DBE | % disolved 15 min | % disolved 30 min | % disolved 45 min | % disolved 60 min | % disolved 90 min |
|---|---|---|---|---|---|---|---|---|---|---|---|---|---|---|---|
| 5a | 50 | | | | | | 50 | | | | 10 | 30 | 40 | 45 | 85 |
| 5b | 50 | 50 | | | | | | | | | 10 | 25 | 30 | 40 | 60 |
| 5c | 25 | 25 | | 50 | | | | | | | 20 | 30 | 45 | 50 | 55 |
| 5d | 50 | | | | | | | | | 50 | 25 | 25 | 25 | 30 | 50 |
| 5e | 50 | | | 50 | | | | | | | 40 | 45 | 45 | 60 | 65 |
| 5f | 33.3 | 33.3 | | | | | | | | 33.3 | 10 | 20 | 25 | 30 | 60 |
| 5g | 25 | 50 | | | | | | | | 25 | 20 | 25 | 40 | 60 | 90 |
| 5h | 15 | 15 | 15 | | 15 | | | | | 40 | 10 | 30 | 35 | 70 | 95 |
| 5i | 30 | 15 | 15 | | 15 | | | | | 25 | 10 | 15 | 40 | 80 | 80 |
| 5j | 22 | | | 60 | | | | | | 18 | 15 | 20 | 30 | 50 | 55 |
| 5k | 40 | | | 60 | | | | | | | 10 | 20 | 50 | 75 | 80 |
| 5l | 40 | | | 20 | | | | | | 40 | 5 | 10 | 50 | 80 | 85 |
| 5m | 90 | | | | | | | | 10 | | 2 | 3 | 10 | 30 | 40 |
| 5n | 80 | | | | | | | | 20 | | 20 | 40 | 60 | 85 | 96 |
| 5o | 70 | | | | | | | | 30 | | 10 | 20 | 90 | 95 | 100 |
| 5p | 97 | | | | | | | | 3 | | 10 | 50 | 100 | | |
| 5q | 100 | | | | | | | | | | 2 | 90 | 100 | | |
| 5r | 97 | | | | | | | 3 | | | 2 | 80 | 95 | 100 | |
| 5s | 94 | | | | | | | 3 | 3 | | 2 | 90 | 90 | 95 | 100 |

TABLE 6

DER 383 EPOXY RESIN REMOVAL

| Cleaning Composition | PC | EC-50 | NMP | DPM | BA | MAIK | PM | Acetone | DBE | % disolved 15 min | % disolved 30 min | % disolved 45 min | % disolved 60 min | % disolved 90 min |
|---|---|---|---|---|---|---|---|---|---|---|---|---|---|---|
| 6a | 50 | | | | | | 50 | | | 50 | 80 | 100 | | |
| 6b | 50 | 50 | | | | | | | | 80 | 90 | 95 | 100 | |
| 6c | 25 | 25 | | 50 | | | | | | 50 | 60 | 70 | 90 | 100 |
| 6d | 50 | | | | | | | | 50 | 75 | 80 | 85 | 90 | 100 |
| 6e | 50 | | | 50 | | | | | | 20 | 40 | 50 | 60 | 75 |
| 6f | 33.3 | 33.3 | | | | | | | 33.3 | 25 | 30 | 35 | 50 | 80 |
| 6g | 25 | 50 | | | | | | | 25 | 10 | 20 | 40 | 60 | 90 |
| 6h | 15 | 15 | 15 | | 15 | | | | 40 | 5 | 25 | 35 | 50 | 80 |
| 6i | 30 | 15 | 15 | | 15 | | | | 25 | 10 | 40 | 75 | 80 | 95 |
| 6j | 22 | | | 60 | | | | | 18 | 20 | 25 | 25 | 25 | 40 |
| 6k | 40 | | | 60 | | | | | | 10 | 20 | 25 | 25 | 50 |

TABLE 6-continued

DER 383 EPOXY RESIN REMOVAL

| Cleaning Composition | PC | EC-50 | NMP | DPM | BA | MAIK | PM | Acetone | DBE | % disolved 15 min | % disolved 30 min | % disolved 45 min | % disolved 60 min | % disolved 90 min |
|---|---|---|---|---|---|---|---|---|---|---|---|---|---|---|
| 6l | 40 |  | 20 |  |  |  |  |  | 40 | 20 | 20 | 20 | 25 | 40 |
| 6m | 90 |  |  |  |  |  |  | 10 |  | 5 | 7 | 10 | 15 | 30 |
| 6n | 80 |  |  |  |  |  |  | 20 |  | 20 | 25 | 30 | 50 | 90 |
| 6o | 70 |  |  |  |  |  |  | 30 |  | 20 | 30 | 50 | 60 | 95 |
| 6p | 97 |  |  |  |  |  |  | 3 |  | 2 | 5 | 100 |  |  |

What is claimed is:

1. A process useful for the removal of uncured components from a substrate wherein the uncured components were used in the preparation of a polymer, comprising: applying a cleaning composition to the residue in an amount sufficient to dissolve at least a portion of the uncured components, wherein the cleaning composition comprises an alkylene carbonate.

2. The process of claim 1 wherein substrate is a tool used in the preparation of the polymer.

3. The process of claim 1 wherein the cleaning composition further comprises at least one compound selected from the group consisting of an alcohol, a glycol ether, a dibasic ester, a ketone and a heterocyclic compound.

4. The process of claim 1 wherein the cleaning composition further comprises:
   from about 0 to about 50 percent by weight of at least one alcohol;
   from about 0 to about 50 percent by weight of at least one glycol ether;
   from about 0 to about 50 percent by weight of at least one dibasic ester;
   from about 0 to about 25 percent by weight of at least one ketone; and
   from about 5 to about 50 percent by weight of at least one heterocyclic compound.

5. The process of claim 4 wherein the at least one ketone is acetone, methyl ethyl ketone (MEK), 5-methyl-2-hexanone (MIAK), or methyl isobutyl ketone.

6. The process of claim 4 wherein the at least one heterocyclic compound is N-methyl pyrrolidone.

7. The process of claim 1 wherein the cleaning composition further comprises:
   from about 0 to about 50 percent by weight of at least one alcohol;
   from about 10 to about 50 percent by weight of at least one glycol ether;
   from about 0 to about 50 percent by weight of at least one dibasic ester;
   from about 0 to about 25 percent by weight of at least one ketone; and
   from about 0 to about 50 percent by weight of at least one heterocyclic compound.

8. The process of claim 7 wherein the at least one ketone is acetone, methyl ethyl ketone (MEK), 5-methyl-2-hexanone (MIAK), or methyl isobutyl ketone.

9. The process of claim 7 wherein the at least one heterocyclic compound is N-methyl pyrrolidone.

10. The process of claim 1 wherein the cleaning composition further comprises:
    from about 0 to about 50 percent by weight of at least one alcohol;
    from about 0 to about 50 percent by weight of at least one glycol ether;
    from about 5 to about 50 percent by weight of at least one dibasic ester;
    from about 0 to about 25 percent by weight of at least one ketone; and
    from about 0 to about 50 percent by weight of at least one heterocyclic compound.

11. The process of claim 10 wherein the at least one ketone is acetone, methyl ethyl ketone (MEK), 5-methyl-2-hexanone (MIAK), or methyl isobutyl ketone.

12. The process of claim 10 wherein the at least one heterocyclic compound is N-methyl pyrrolidone.

13. The process of claim 1 wherein the cleaning composition further comprises:
    from about 5 to about 50 percent by weight of at least one alcohol;
    from about 0 to about 50 percent by weight of at least one glycol ether;
    from about 0 to about 50 percent by weight of at least one dibasic ester;
    from about 0 to about 25 percent by weight of at least one ketone; and
    from about 0 to about 50 percent by weight of at least one heterocyclic compound.

14. The process of claim 13 wherein the at least one ketone is acetone, methyl ethyl ketone (MEK), 5-methyl-2-hexanone (MIAK), or methyl isobutyl ketone.

15. The process of claim 13 wherein the at least one heterocyclic compound is N-methyl pyrrolidone.

16. The process of claim 1 wherein the cleaning composition further comprises:
    from about 0 to about 50 percent by weight of at least one alcohol;
    from about 0 to about 50 percent by weight of at least one glycol ether;
    from about 0 to about 50 percent by weight of at least one dibasic ester;
    from about 1 to about 25 percent by weight of at least one ketone; and
    from about 0 to about 50 percent by weight of at least one heterocyclic compound.

17. The process of claim 16 wherein the at least one ketone is acetone, methyl ethyl ketone (MEK), 5-methyl-2-hexanone (MIAK), or methyl isobutyl ketone.

18. The process of claim 17 wherein the at least one heterocyclic compound is N-methyl pyrrolidone.

19. The process of claim 1 wherein the uncured components are for preparation of polyurethane foam.

20. The process of claim 1 wherein the uncured components are for preparation of polyester.

21. The process of claim 16 wherein the uncured components are for preparation of epoxy.

22. The process of claim 16 wherein the dibasic ester is an aliphatic diester having a molecular weight of up to about 200.

23. The process of claim 16 wherein the ketone has up to 20 carbon atoms.

24. The process of claim 16 wherein the glycol ether has up to 20 carbon atoms.

25. The process of claim 16 wherein the alcohol has up to 20 carbon atoms.

26. The process of claim 16 wherein the alcohol is benzyl alcohol.

27. The process of claim 1 wherein the cleaning composition is applied at a temperature of from about 0 degrees Fahrenheit to about 125 degrees Fahrenheit.

28. The process of claim 1 wherein the cleaning composition is applied by spraying.

* * * * *